United States Patent

Tsukagoshi

[11] Patent Number: 6,067,653
[45] Date of Patent: May 23, 2000

[54] DATA DECORDER AND DATA DECODING METHOD

[75] Inventor: Ikuo Tsukagoshi, Tokyo, Japan

[73] Assignee: Sony Corporation, Tokyo, Japan

[21] Appl. No.: 08/983,067

[22] PCT Filed: Apr. 10, 1997

[86] PCT No.: PCT/JP97/01234

§ 371 Date: Dec. 12, 1997

§ 102(e) Date: Dec. 12, 1997

[87] PCT Pub. No.: WO97/39578

PCT Pub. Date: Oct. 23, 1997

[30] Foreign Application Priority Data

Apr. 12, 1996 [JP] Japan ................................ 8-114438

[51] Int. Cl.[7] .............................. G06F 11/00; G06K 5/04
[52] U.S. Cl. ......................... 714/746; 714/704; 714/700; 360/77.04
[58] Field of Search .................................. 714/48, 49, 54, 714/57, 704, 746, 748, 819, 700; 364/265, 265.1, 265.2, 943.9, 944.5; 360/77.04, 53; 377/33; 341/94

[56] References Cited

U.S. PATENT DOCUMENTS

| 3,685,015 | 8/1972 | Bocek | 371/65 |
| 3,872,431 | 3/1975 | Besenfelder et al. | 341/94 |
| 4,024,498 | 5/1977 | McIntosh | 371/1 |

Primary Examiner—Trinh L. Tu
Attorney, Agent, or Firm—Frommer Lawrence & Haug, LLP.; William S. Frommer

[57] ABSTRACT

Bit stream data that contains a digital video signal and character data is input to a decoding apparatus. Bit map character data is extracted by a demultiplexer 1 and supplied to a data decoder 7. A word detecting portion 20 of the data decoder 7 detects a line that has error data. A line processor 40 detects a line that has error data and stores an address of the end of the line to a register. Thus, when data is displayed, while it is being read from a buffer memory 22 and decoded, the buffer memory is randomly accessed. Consequently, a particular line can be displayed a plurality of times. Alternatively, a particular line can be skipped. Instead of reading data of a line that has an error, by accessing lines that immediately precede or immediately follow the line that has the error in the memory, character data can be interpolated for each line.

20 Claims, 18 Drawing Sheets

Fig. 4

| Addr | Y | Cr | Cb | K |
|---|---|---|---|---|
| 0 | 00 | 7F | 7F | 00 |
| 1 | 00 | 7F | 7F | 20 |
| 2 | 00 | 7F | 7F | 40 |
| ⋮ | | | | |
| 6 | 00 | 7F | 7F | C0 |
| 7 | 00 | 7F | 7F | E0 |
| 8 | 00 | 7F | 7F | E0 |
| 9 | 20 | 7F | 7F | E0 |
| ⋮ | | | | |
| E | C0 | 7F | 7F | E0 |
| F | E0 | 7F | 7F | E0 |

E0: SUBTITLE DATA 100%
   : VIDEO DATA      0%

Fig. 6

(1) FROM SYSTEM CONTROLLER14

| Signal | BITS | Description | Rate |
|---|---|---|---|
| RESET | 1 | RESETS SYSTEM RESET | |
| BUFFER CLEAR | 1 | COMMAND FOR DISCARDING DATA RECEIVED FROM SYSCON DUE TO ERROR OF CODE DATA | MAX30Hz |
| DECODE START | 1 | STARTS DECODING (STARTS READING DATA FROM CODE BUFFER) | MAX30Hz |
| STREAM_SELECT | 5 | DESIGNATES STREAM INCLUDING IDENTIFICATION OF NORMAL REPRODUCTION/SPECIAL REPRODUCTION, AND SO FORTH | STATIC |
| CH_SELECT | 5 | DESIGNATES CHANNEL TO BE DECODED | STATIC |
| SPECIAL | 1 | DESIGNATES SPECIAL REPRODUCTION | AS IT HAPPENS |
| REPEAT TIME | 8 | REPRESENTS DISPLAY TIME IN SPECIAL REPRODUCTION | AS IT HAPPENS |
| XSQUEEZE | 1 | REPRESENTS USE OF MONITOR WITH ASPECT RATIO OF 16:9 | STATIC |
| ON/OFF | 1 | TURNS ON/OFF SUPERIMPOSITION OF SUBTITLE | STATIC |
| U_POSITION | 8 | REPRESENTS USER-DESIGNATED DISPLAY POSITION (VERTICAL DIRECTION) | STATIC |

(2) TO SYSTEM CONTROLLER14

| Signal | BITS | Description | Rate |
|---|---|---|---|
| PTS | 33 | REPRESENT TIME STAMP OF DATA DISPLAY TIME | MAX30Hz |
| BUFFER OVERFLOW | 1 | REPRESENTS DATA FOR TWO BANKS IN BUFFER | MAX30Hz |
| BUF WRITE TERM | 1 | REPRESENTS COMPLETION OF WRITE-OPERATION OF DATA FOR ONE BANK | |
| HEADER ERROR | 1 | REPRESENTS ERROR OF HEADER | MAX30Hz |
| DATA ERROR | 1 | REPRESENTS ERROR OF DATA | MAX30Hz |
| SPECIAL_ACK | 1 | REPRESENTS ACKNOWLEDGMENT OF SPECIAL REPRODUCTION | MAX30Hz |
| REPEAT | 8 | REPRESENTS DISPLAY TIME (BOTH NORMAL AND SPECIAL) | AS IT HAPPENS |
| V.POSITION | 8 | REPRESENTS DISPLAY POSITION IN ENCODE STATE | MAX30Hz |
| FADE FACTOR | 4 | REPRESENTS FADE IN/OUT TIME | MAX30Hz |

Fig. 7

---
(1) (2) : 8bit bus + 4bit select + 1bit I/O
others : real signal bits
---

(3) from generator              bits
- H sync      1
- V sync      1
- 13.5MHz clock      1

(4) from demux
- data stream      8
- strobe      1
- error      1

(5) to code buffer
- address      15
- data      8
- xce      1
- xwe      1
- xoe      1

(6) from video decoder
- video data (4:2:2)      16

(7) to DAC
- video data (4:2:2)      16

Subtitle decoder buffer model

Fig. 14
no error
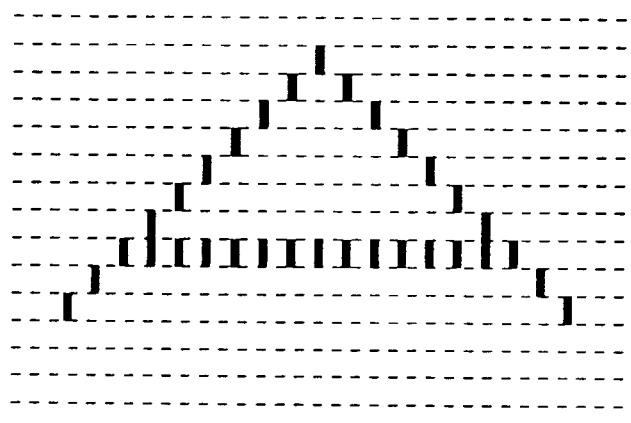
(1)
error
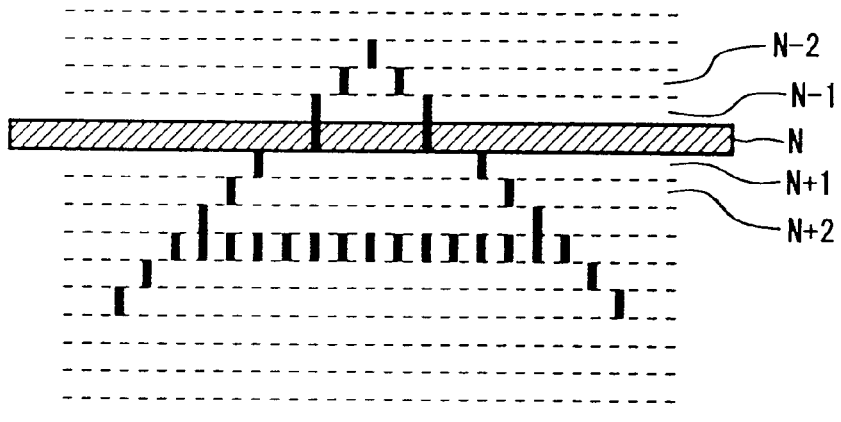
(2)

1Block→75Hz
1Frame→75×98Hz
subcode bit rate=7.35kBytes/s

TRANSMISSION FORMAT

DATA DECORDER AND DATA DECODING METHOD

TECHNICAL FIELD

The present invention relates to a data decoding apparatus and a data decoding method that allow an error that takes place in for example video data, audio data, and subtitles to be interpolated with another data and a display area to be interactively varied corresponding to a command issued by the user.

BACKGROUND ART

When a video program created in a foreign country is reproduced, subtitles are sometimes displayed at a lower portion or a right side of the screen. In video disc programs and conventional television broadcast programs, such subtitles have been superimposed in video pictures.

On the other hand, in the CAPTAIN (Character and Pattern Telephone Access Information Network System) serviced in Japan), such subtitles are sent as character code or dot patters. In the CD-G (Graphics) system, with subcode used to record graphics data, subtitles can be recorded.

Next, the data format of the CD-R system will be described. As shown in FIG. 17A, data of one frame is composed of subcode of one byte and data of 32 bytes.

The 32-byte data is composed of 24-byte audio data and eight-byte error correction code. The 24-byte audio data is composed of 12 samples. Six samples are assigned to each of L and R channels. Each sample is composed of two bytes.

In addition, as shown in FIG. 17B, one block is composed of subcode of 98 frames. FIG. 17C shows the content of one block. As shown in FIG. 17C, subcode of the individual frames is represented with eight channels P, Q, R, S, T, U, V, and W. The subcode of the first two of the 98 frames are sync patterns S0 and S1. In the subcode of the remaining 96 frames, various subcode data can be recorded.

However, track search data has been assigned to data of P and Q channels of subcode of one byte (individual bits are denoted by P to W). Thus, graphics data can be assigned to 6×96 bits of the remaining channels R to W.

Since data of one block is set at a frequency of 75 Hz, the data rate of one frame becomes 75×98 bytes. Thus, the data rate of subcode is 7.35 kbytes/sec.

FIG. 18 shows a transmission format of such graphics data. As shown in FIG. 18, one packet is composed of 96 symbols. One symbol is composed of data of six bits of each of channels R to W. In addition, one packet is composed of four packs. Each pack is composed of a total of 24 symbols that are symbols 0 to 23. Mode information is assigned to three bits R, S, and T of the symbol 0. Item information is assigned to three bits U, V, and W of the symbol 0. With a combination of the mode information and item information, modes shown in Table 1 are defined.

TABLE 1

| Mode | Item | |
|---|---|---|
| 000 | 000 | 0 mode |
| 001 | 000 | Graphics mode |
| 001 | 001 | TV graphics mode |
| 111 | 000 | User mode |

An instruction has been assigned to the symbol 1. A mode, an item, and a parity against an instruction have been assigned to the symbols 2 and 3. Thus, an area for graphics data is substantially 12 symbols ranging from the symbol 4 to the symbol 19. A parity for 20 symbols ranging from the symbol 0 to the symbol 19 is assigned to four symbols ranging from the symbol 20 to the symbol 23.

In such a manner, in the CD-G system, graphics data can be assigned as binary data to an area of 6×12 pixels of each pack. The data rate of packs is 75 (Hz)×4=300 packs/sec. Assuming that one character is assigned to the area of 6×12 pixels, 300 characters can be sent per second.

Since one screen defined in the CD-G system is composed of 288 horizontal pixels×192 lines, as given by the following expression, it takes 2.56 sec. to send characters for one screen.

$$[(288/6) \times (192/12)/300 = 2.56]$$

In this case, to represent data in hexadecimal notation, each pixel requires four bits. Thus, for one character pattern, four different patters should be sent. Consequently, the resultant transmission time amounts to 10.24 sec. that is four times 2.56 sec.

However, when an error takes place in video data, graphics data, or pixel data such as subtitle data that has been compressed and encoded by for example the run-length encoding method or DPCM encoding method, the remaining data of the current line is not correctly displayed. Thus, the use cannot comfortably see the resultant picture on the display.

To solve this problem, a structure for causing data of a frame/field that has an error not to be output may be used. Alternatively, a structure for causing such data to be muted may be used. However, from a point of view of the user, it is not convenient to cause data that has an error not to output at all. For example, it is desired to accomplish a function of which in the case that the degree of an error is low, data that has the error is interpolated with other data and in the case that the degree of the error is large, the data that has the error is not output.

DISCLOSURE OF THE INVENTION

The present invention is made from the above-described point of view. When subtitle information or the like that has an error is supplied, a line that has the error is substituted with another line using information that is randomly accessed in a buffer memory. Alternatively, when an error is frequently output, a line that has the error is prohibited from being displayed.

There are two methods for detecting an error. In the first method, when data is written to a buffer memory, an error is detected. In the second method, when data is read from a buffer memory, an error is detected. However, in the first method, although the position of an error is detected before data is displayed, a circuit that detects the end of each line is required.

On the other hand, in the second method, it is necessary to store an error flag to the buffer memory as well as data. In addition, since a detected error is displayed on real time basis, data that has the error is directly output. To solve this problem, according to the present invention, the first method is used.

In addition, the error detecting method is accomplished by detecting line end identification code. Picture data is often compressed by the run-length encoding method. In this case, line end code (End_Of_Line) that represents the end of one line is unique code. To detect the line end code, it can be determined what line is being currently written.

According to the present invention, a line that has an error can be substituted with another line. Alternatively, a line that has an error can be prohibited from being displayed. Moreover, according to the present invention, such substitution or prohibition can be used anytime in normal reproduction state/special reproduction (hereinafter also referred to as trick play) state.

BRIEF DESCRIPTION OF DRAWINGS

FIG. 4 is an example of a color lookup table;

FIG. 6 is a list showing the content of information sent from a system controller to a controller of the data decoder and vice versa;

FIG. 7 is a list showing the content of information sent from the system controller to the controller of the data decoder and vice versa;

FIG. 14 is a schematic diagram showing a processed result of the line processor;

BEST MODES FOR CARRYING OUT THE INVENTION

Figure 1:
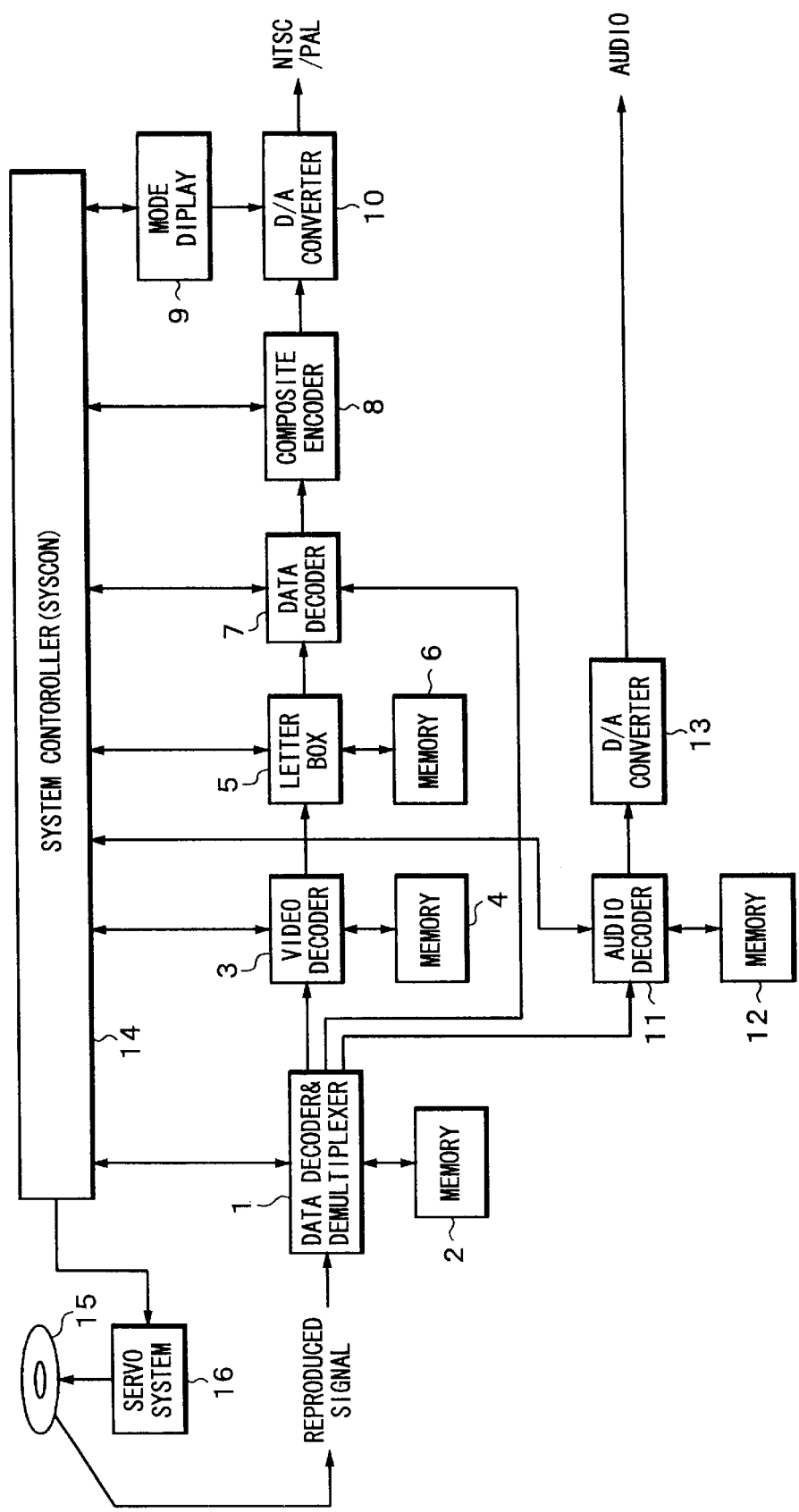
FIG. 1 is a block diagram showing an overall structure of a player system having a subtitle/graphics data decoding apparatus.

A subtitle decoding apparatus receives a graphics/subtitle bit stream that has been multiplexed and video data that has been decoded. After a bit stream of the multiplexed subtitle data is stored in a code buffer, the bit stream is decoded at predetermined timing. The decoded graphics/subtitle data is superimposed with video data.

Such a decoding apparatus will be briefly described with reference to a decoder system in a player shown in FIG. 1.

For example, a signal reproduced from a digital video disc 15 that is an information record medium is sent to a data decoder/demultiplexer 1. Digital data recorded on the disc 15 is read by an optical pickup (not shown). When a signal is reproduced from the disc 15, a servo system 16 controls spindle mode, focus, and tracking.

The resultant data is channel-decoded and error-corrected in association with a memory 2. The resultant video data, subtitle data, and audio data are sent to a video decoder 3, a data decoder 7, and an audio decoder 11, respectively. The video decoder 3 decodes the received bit stream into video data in association with a memory 4.

A letter box circuit 5 performs a filtering process that decreases the vertical direction of the screen ¾ times so that a picture is displayed with a perfect circle ratio of 100% on a monitor with an aspect ratio of 4:3 in the case that an output of the video decoder 3 is in the squeeze mode. In this case, a memory 6 for adjusting timing equivalent to ¼ field is used. In addition, output data of the video decoder 3 may be sent not through the letter box circuit 5 so as to directly output video data in the squeeze mode.

The audio decoder 11 decodes the received bit stream into audio data in association with a memory 12. The decoded audio data is supplied to a D/A converter 13. The D/A converter 13 converts the decoded audio data into an analog audio signal. The resultant audio signal is supplied to an audio circuit.

The data decoder 7 decodes the bit stream data received from the demultiplexer 1. Thereafter, the data decoder 7 superimposes the decoded bit stream with graphics data such as subtitles. The superimposed video data is supplied to a composite encoder 8. The composite encoder 8 converts the superimposed video data into a video signal corresponding to the NTSC system, PAL system, or SECAM system. The resultant signal is supplied to a video D/A converter 10. The D/A converter 10 converts the signal received from the D/A converter into an analog video signal.

In addition, a system controller 14 that totally controls the above operations is disposed. The system controller 14 causes a user's command and various information to be displayed on a mode display 9 and these command and information to be superimposed thereon.

According to the present invention, in the above-described digital video player, the data decoder 7 superimposes the reproduced video data with graphics data such as subtitles. For easy understanding of the present invention, with reference to FIG. 2, an encoding system that encodes graphics/subtitle data will be described in brief.

Figure 2:
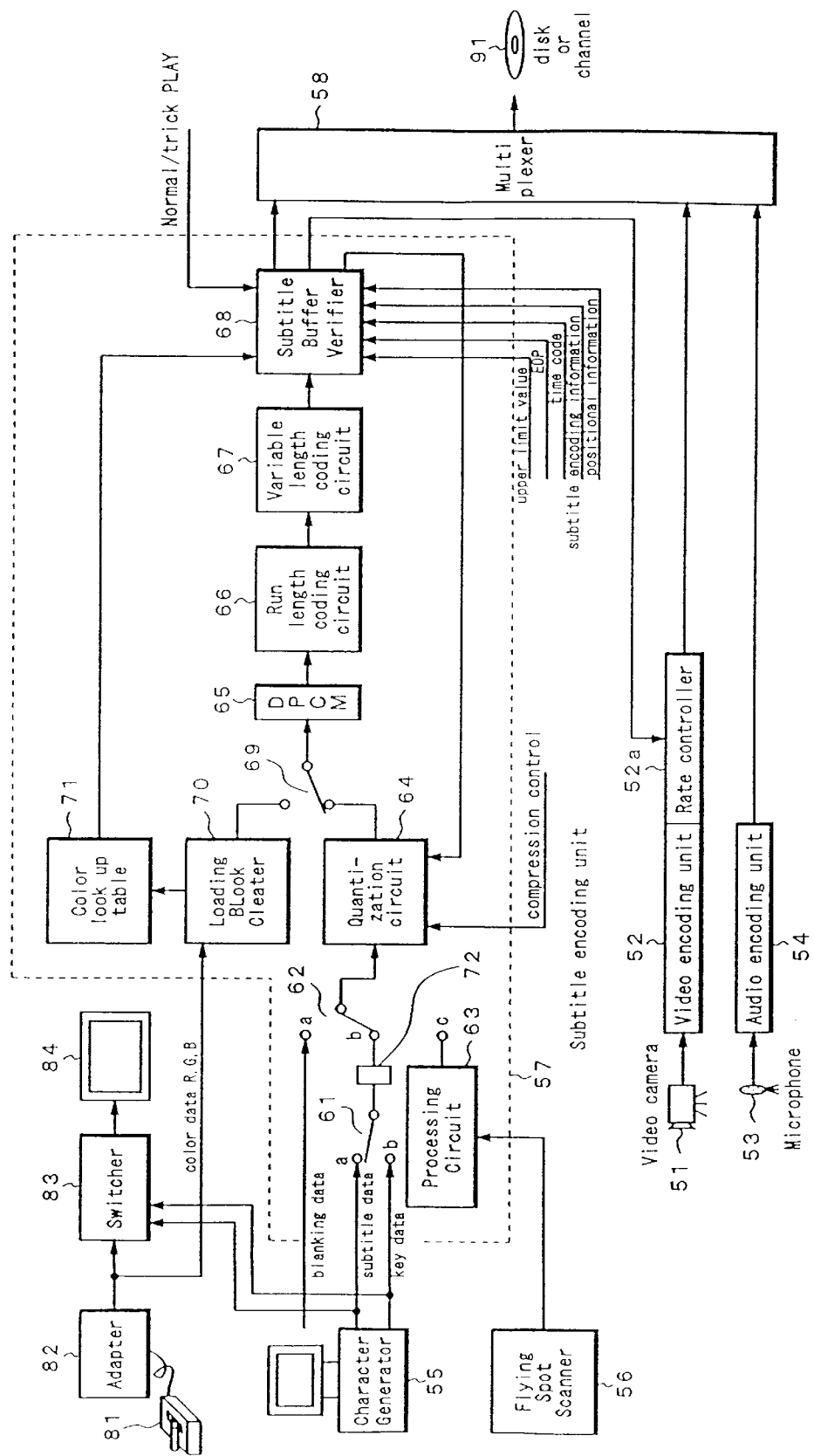
FIG. 2 is a block diagram showing an overall structure of a data encoding unit having a means for accomplishing a subtitle stream.

Referring to FIG. 2, a video signal received from a video camera 51 is supplied to a video encoding unit 52. The video encoding unit 52 has a rate controller 52a. A subtitle buffer verifier 68 (hereinafter referred to as SBV circuit) controls the amount of data to be generated with required control information. Likewise, the compression rate of the video data is controlled corresponding to a bit rate control signal that is output from the SBV circuit 68.

In other words, as will be described later, a subtitle encoding unit 57 surrounded by a dotted line in FIG. 2 encodes subtitle data. When the amount of encoded data is small, even if the amount of encoded video data is increased, the total amount of data does not increase. Thus, the quality of the video pictures can be increased. In contrast, when the amount of subtitle data is large, the amount of data for the video data is decreased.

When data of which each pixel is quantized with four bits is encoded for one page equivalent to one screen, if the resultant amount of data exceeds the size of a code buffer of the SBV circuit 68, an overflow takes place. In this case, in the encoding process for the page, the gradation is decreased from four bits. Thereafter, the resultant data is re-quantized by a quantization circuit 64.

The resultant video data is compressed, encoded, and packet-segmented by the video encoding unit 52. The resultant video data (for example, 4:2:2 component signals) is supplied to a multiplexer 58.

Likewise, an audio signal received from a microphone 53 is supplied to an audio encoding unit 54. The audio encoding unit 54 performs a signal process such as converting the audio signal into a digital signal. In addition, the audio encoding unit 54 compresses, encodes, and packet-segments the digital signal. In this case, with a tape recorder instead of the microphone 53, an audio signal reproduced from the tape recorder may be supplied to the audio encoding unit 54. The audio encoding unit 54 encodes the audio signal and sends the encoded audio signal to the multiplexer 58.

On the other hand, subtitle data generated by a character generator 55 or subtitle data received from a flying spot scanner 56 is supplied to the subtitle encoding unit 57. The subtitle encoding unit 57 compresses, encodes, and packet-segments the subtitle data received from the character generator 55 or the flying spot scanner 56 and then supplies the resultant data to the multiplexer 58.

The multiplexer 58 multiplexes the packet-segmented data received from the subtitle encoding unit 57, the video encoding unit 52, and the audio encoding unit 54 corresponding to for example the time-division multiplexing method. In addition, the multiplexer 58 performs a signal process for error correction and a modulating process such as EFM (eight to fourteen modulation), QPSK, or QAM. Thereafter, the resultant data is recorded on a record medium such as a disc 91 or sent to a receiver through a channel. Corresponding to data recorded on the record medium such as the disc 91, the digital video disc 15 is fabricated. In the case of the digital television broadcast, after a predetermined process is performed for the resultant data, the data is sent to a communication (broadcast) satellite.

Next, the operation of the subtitle encoding unit 57 will be described. The character generator 55 generates subtitle data corresponding to a video picture encoded by the video encoding unit 52. The resultant subtitle data is supplied to a contact a of a switch 61 of the subtitle encoding unit 57. Key data is supplied to a contact b of the switch 61 from the character generator 55. The switch 61 is switched to the contact a or the contact b at predetermined timing so as to select subtitle data or key data. The selected data is supplied to the quantization circuit 64 through a digital filter circuit 72 and a contact b of a switch 62.

The subtitle encoding unit 57 also has a DPCM circuit 65, a run-length coding circuit 66, a variable-length coding circuit 67, and the above-described SBV circuit 68 that encode the subtitle data. In FIG. 2, reference numerals 81, 82, 83, and 84 are circuits and units that generate various types of subtitle data with a wipe function to a color lookup table 71, fade-in/fade-out function, and color control function.

Data that has been encoded in the above-described manner (namely, output data of the multiplexer 58) corresponds to a reproduced signal supplied to the data decoder & data demultiplexer 1 shown in FIG. 1.

Next, subtitle data (or caption data) will be described. The brightness of the background of characters of a subtitle is designated so that the user can clearly see the characters of the subtitle. Thus, the subtitle data is composed of key data and fill data. Next, with reference to FIGS. 3A, 3B, and 3C, these data will be described. A signal level shown in FIG. 3 corresponds to a level in the color lookup table.

Figures 3A, 3B, 3C:
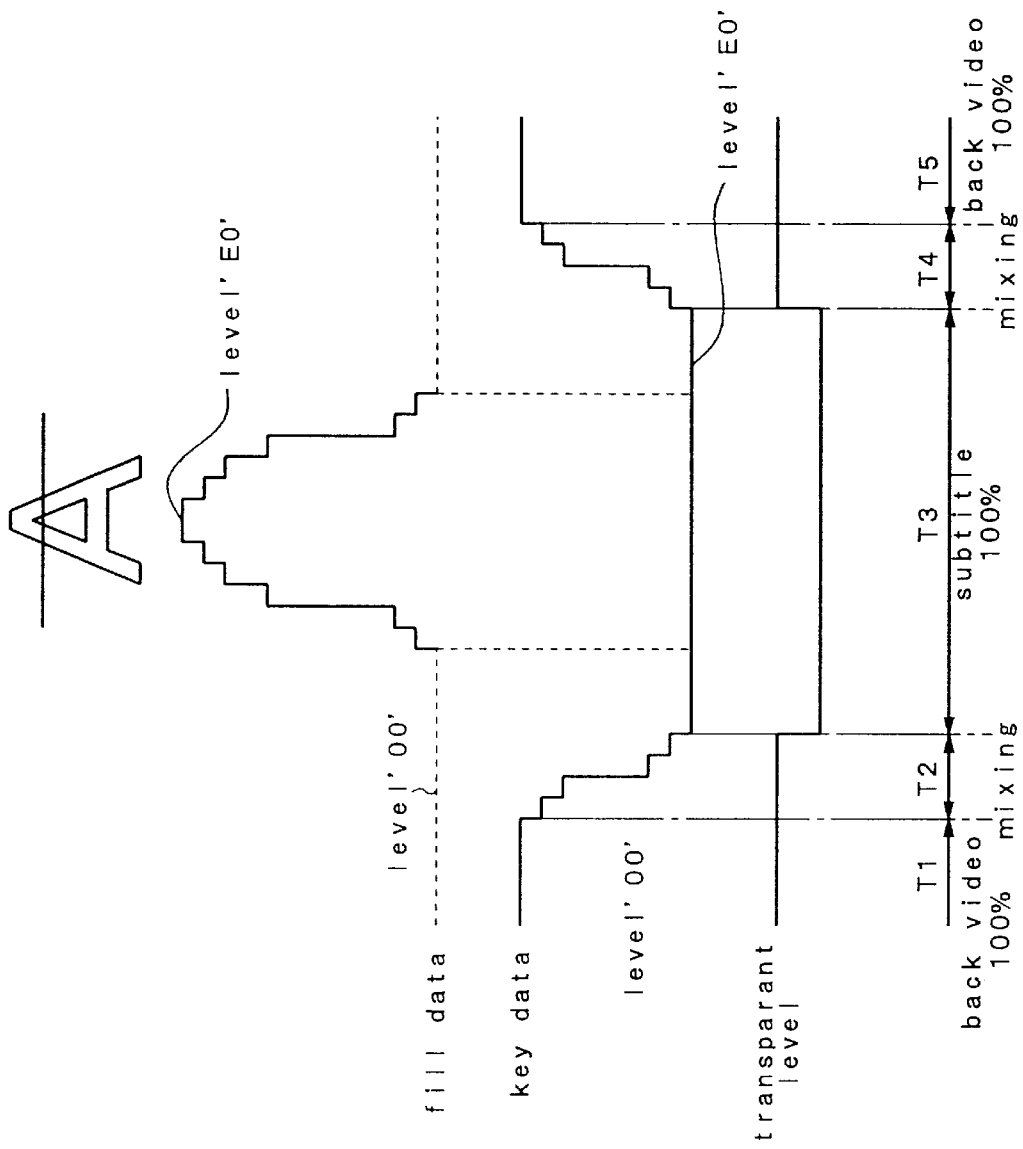
FIGS. 3A, 3B, and 3C are schematic diagrams for explaining subtitle data that is input to a subtitle data encoding unit.

For example, as shown in FIG. 3A, it is assumed that a character A is present as a subtitle. FIG. 3B shows fill data of one horizontal line. As shown in FIG. 3B, at period T3, the fill data has a level corresponding to the luminance of the character to be displayed. At periods T1 and T2 that precede period T3 and at periods T4 and T5 that follow T3, the fill data has the minimum level. In such a manner, the fill data is composed of a pattern of characters to be displayed and a luminance level of the pattern (namely, pattern information of the subtitle).

On the other hand, as shown in FIG. 3C, at period T3 of which the character is displayed, the key data has the minimum level. At periods T1 and T5 that slightly precede and follow period T3, the key data has the maximum level. At period T2 between period T1 and period T3 and at period T4 between period T3 and period T5, the key data has a predetermined intermediate level between the maximum level and the minimum level. At period T2, the key data gradually varies from the maximum level to the minimum level. In contrast, at period T4, the key data gradually varies from the minimum level to the maximum level.

In other words, at period T3, the video signal of the background video picture is substantially attenuated to a black level. In contrast, at period T1 and period T5, the fill signal corresponding to the subtitle is muted to a predetermined level. At period T2 and period T4, the background video picture is attenuated with a ratio corresponding to the value of the key data. In this embodiment, as the value of the key data is large, the attenuation ratio of the background video picture decreases (thus, the attenuation ratio of the fill data increases). As the value of the key data is small, the attenuation ratio of the background video picture increases (the attenuation ratio of the fill data decreases).

Thus, at the period of which the character is displayed, the background video picture is substantially and completely muted. In the vicinity of the character, since the background video picture is gradually muted, the subtitle (characters) can be prevented from being indistinctly displayed.

When the gradation of the subtitle data is represented as shown in FIGS. 3A, 3B, and 3C, in the encoding unit shown in FIG. 2, the color lookup table 71 generates a luminance value of fill data and a mixing ratio K as the key data and sends the luminance value and the mixing ratio K to the decoding apparatus. If necessary, the multiplexed color lookup table has been downloaded to the register in the decoding apparatus. Thereafter, data to be decoded is input.

FIG. 4 shows an example of the color lookup table. Referring to FIG. 4, luminance (Y), color difference (Cr and Cb) and key data (K) (that represents the mixing ratio with the background) are registered with up to eight bits each. FIGS. 3A, 3B, and 3C show levels of the luminance signal and key data. The values of the levels shown in FIG. 3 correspond to the levels of those in the color lookup table shown in FIG. 4.

A decoding apparatus corresponding to the subtitle encoding unit 57 in the encoding unit shown in FIG. 2 is a data decoder that processes a signal reproduced by the player shown in FIG. 1.

Figure 5:
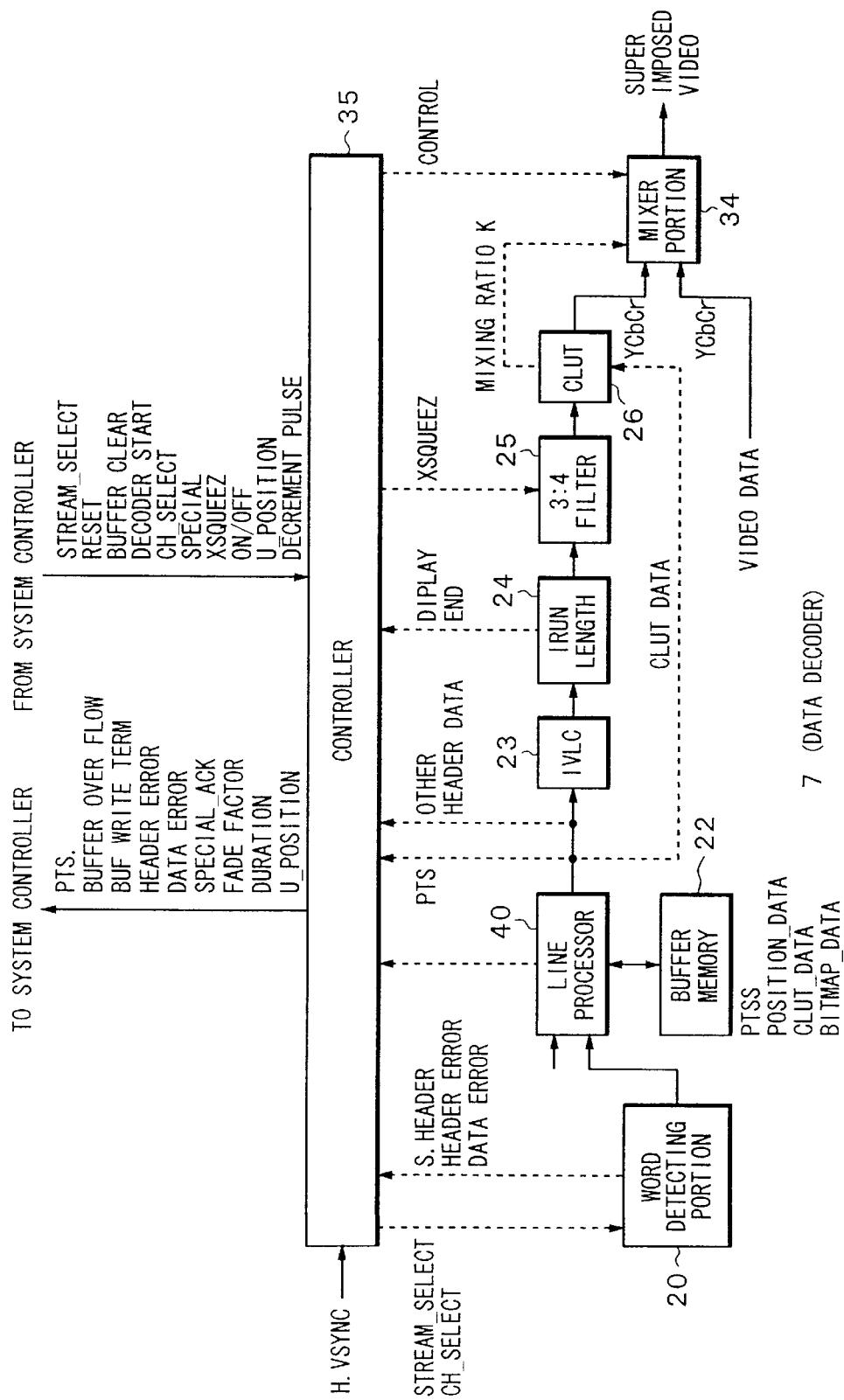
FIG. 5 is a block diagram showing the structure of a data decoder that decodes subtitle/graphics data according to the present invention.

FIG. 5 is a block diagram showing the detailed structure of the data decoder 7 that performs the graphics/subtitle decoding process.

A word detecting portion 20 receives a data bit stream as a strobe signal from the demultiplexer 1. The word detecting portion 20 detects time stamp information, a header error, and a data error from the strobe signal and sends the extracted information to a controller 35. The controller 35 stores display position information, update data of the color lookup table, and bit map pixel data to a buffer memory 22 through a line processor 40 (that will be described later).

The controller 35 receives a PTS (data Presentation Time Stamp) from the word detecting portion 20 and sends the PTS to the system controller 14 shown in FIG. 1. Thereafter, the data decoder 7 starts decoding the graphics/subtitle data received from the system controller 14.

In the normal reproduction mode, the graphics/subtitle data is repeatedly read for a duration byte-aligned for each frame from the buffer memory 22. The duration may be decremented by a system synchronizing clock or with a decrement pulse received from the system controller 14. The controller 35 manages the address of the buffer memory 22 and controls the accessing thereof so as to synchronize the buffer memory 22 corresponding to a presentation time stamp. The schedule management of the memory access is performed with the data rate and display rate received from the demultiplexer 1 shown in FIG. 1. In other words, the band width of the memory accessing is determined with the data rate and display rate received from the demultiplexer 1 shown in FIG. 1.

Assuming that the data rate of the data received from the demultiplexer 1 is up to 20 Mbps, when the I/O port of the memory has eight bits, data is written to the buffer memory 22 at 2.5 MHz. On the other hand, data is read from the buffer memory 22 with a display position signal multiplexed at the header portion of the bit stream at proper timing from a V sync (vertical sync signal) and a H sync (horizontal sync signal) after a decode start signal is received from the system controller 14. Assuming that the pixel sampling rate is at 13.5 MHz and the memory read/write operations are switched at the clock period, since the data is written to the butter memory 22 at 2.5 MHz, the lowest rate that satisfies such conditions is 13.5×¼=3.375.

3.375 MHz is assigned as the data write rate of the code buffer. Data is read from the buffer memory 22 in the remaining time period. In other words, the remaining time period is 13.5−3.375=10.125. 10.125 MHz represents that data is read three times in four cycles with a clock of 13.5 MHz. In the case of a memory data bus with 8 bits, to successively read data from the memory three times in the four cycles, when the read data length is 8 bits×¾=6 bits and data of each pixel is composed of 6 bits or less, data can be displayed on real time basis.

When a signal "Special" received from the system controller 14 is "non-normal", the controller 35 sends to the system controller 14 a signal "Special ack" representing that the special reproduction mode has been correctly received.

In the special reproduction mode, when n-times fast forward/fast reverse operation is performed, decrement pulses are generated at n-times rate. In the pause mode, since the decrement pulses are not generated, the same frame is repeatedly decoded. After the controller 35 has detected the EOP (End Of Page) received from an inverse variable-length coding circuit 23, an inverse run-length circuit 24 had decoded the data, and the EOP has been counted for a value equivalent to the duration, then the controller 35 receives a flag "display end" from the inverse run-length coding circuit 24.

In the case that the flag "display end" has not been set, when the word detecting portion 20 detects the EOP of the next page, the controller 35 sends a signal "buffer overflow" to the system controller 14 so as to cause the demultiplexer 1 to stop sending data. The controller 35 updates the display start position for each frame when the system controller 14 commands the controller 35 to do so.

When the buffer memory 22 is composed of an external RAM, the external RAM should have a storage capacity that is equivalent to at least two pages for display and storage that satisfy both the delay compensation in the video decoding process and the above-described access band width.

When the controller 35 writes data to the buffer memory 22 for compensating the delay of the video data, the controller 35 sends the presentation time stamp (PTS) to the system controller 14. The system controller 14 sends a decoding start command to the controller 35 of the data decoder 7 at timing of which the delay (around one field) of the video decoding process and the delay of the letter box process are added to time at which the synchronizing clock of the system controller 14 matches the PTS.

The decode delay is considered because the multiplexer 58 (see FIG. 2) of the encoding unit multiplexes video data, audio data, and additional data assuming that the delay of the decoded data thereof is zero.

When a system synchronization clock is supplied to the data decoder 7, it is not necessary to send the presentation time stamp (PTS) to the system controller 14. In this case, at timing of which the PTS matches the system time in the data decoder 7, data is read from the buffer memory 22 and then the decoding process is performed.

The inverse variable-length coding circuit 23 performs an inverse variable-length coding process for data read from the buffer memory 22 and outputs a pair of level and run. Occasionally, data may be sent not through the inverse variable-length coding circuit 23.

The inverse run-length coding circuit 24 generates levels corresponding to the number of runs. Data that is output from the inverse run-length coding circuit 24 is treated as pixel data. Occasionally, data may be sent not through the inverse run-length coding circuit 24.

When the aspect ratio of the monitor screen is 4:3, a 3:4 interpolation filtering circuit 25 filters data to be horizontally squeezed and displayed with a squeezing ratio of 3:4 so as to obtain data with a full circle ratio of 100%. Thereafter, the resultant data is superimposed with the video data. In this case, the controller 35 reads data from the buffer memory 22 faster than horizontal sync pulses by 90 pixels. When the aspect ratio of the monitor is 16:9, data is sent not through the filter (namely, the filter is bypassed). The state of whether or not the filter is bypassed is selected with a signal "XSqueeze" supplied from the system controller 14 to the controller 35. When a plurality of streams corresponding to a plurality of fonts are sent, the 3:4 interpolation filter 25 is bypassed.

A color lookup table circuit 26 outputs levels of a luminance signal Y and color difference signals U and V registered in the color lookup table (CLUT) and key data K that represents a mixing ratio of the background video data and the signals Y, U, and V in the color lookup table with eight bits each in the full scale. Depending on data structure of the color lookup table, the color lookup table circuit 26 can output such data with four bits each.

The color lookup table is downloadable. The key data K is sent as a mixing ratio to a mixer portion 34. A plurality of CLUTs may be disposed and selected corresponding to a control signal. In addition, with one input bit (for example, the most significant bit) of one CLUT, a color wiping operation that varies time by time may be accomplished.

When a signal "super impose on/off" is turned on, the mixer portion 34 (also referred to as a super imposer) superimposes graphics data such as subtitles with video data corresponding to a mixing ratio thereof. At this point, the mixer portion 34 performs the superimposing process at timing designated with a signal "Position" or a signal "U_Position". When a fade coefficient has been designated to the mode information, the fade coefficient is multiplied by the pattern data at a designated speed so as to perform fade in/out operations. When the signal "super impose on/off" is turned off, only the video data is output. The resultant signal of which each data has been decoded and superimposed is sent from the data decoder to the D/A converter 10 through the composite encoder 8.

FIGS. 6 and 7 show the number of bits and the definition of each signal shown in FIG. 5.

Next, a subtitle buffer managing operation performed by the subtitle encoding unit on the encoding side (see FIG. 2) and the data decoder 7 (player) on the decoding side (see FIG. 5) will be described.

A subtitle stream for normal reproduction is encoded in the encoding unit so that various control information (Normal/Trick play, Position information, Subtitle encoding information, timecode, EOP, Upperlimit value, etc.) is added to bit map pattern data and a desired subtitle buffer managing method is satisfied in the SBV circuit 68 for subtitles.

When a subtitle stream for the special reproduction is sent to the code buffer on the decoding apparatus, it is immediately displayed. Thus, it is not necessary to consider the delay of the stream that has been decoded. Consequently, the managing method for the subtitle buffer in the normal reproduction cannot be applied as it is.

Figure 8:
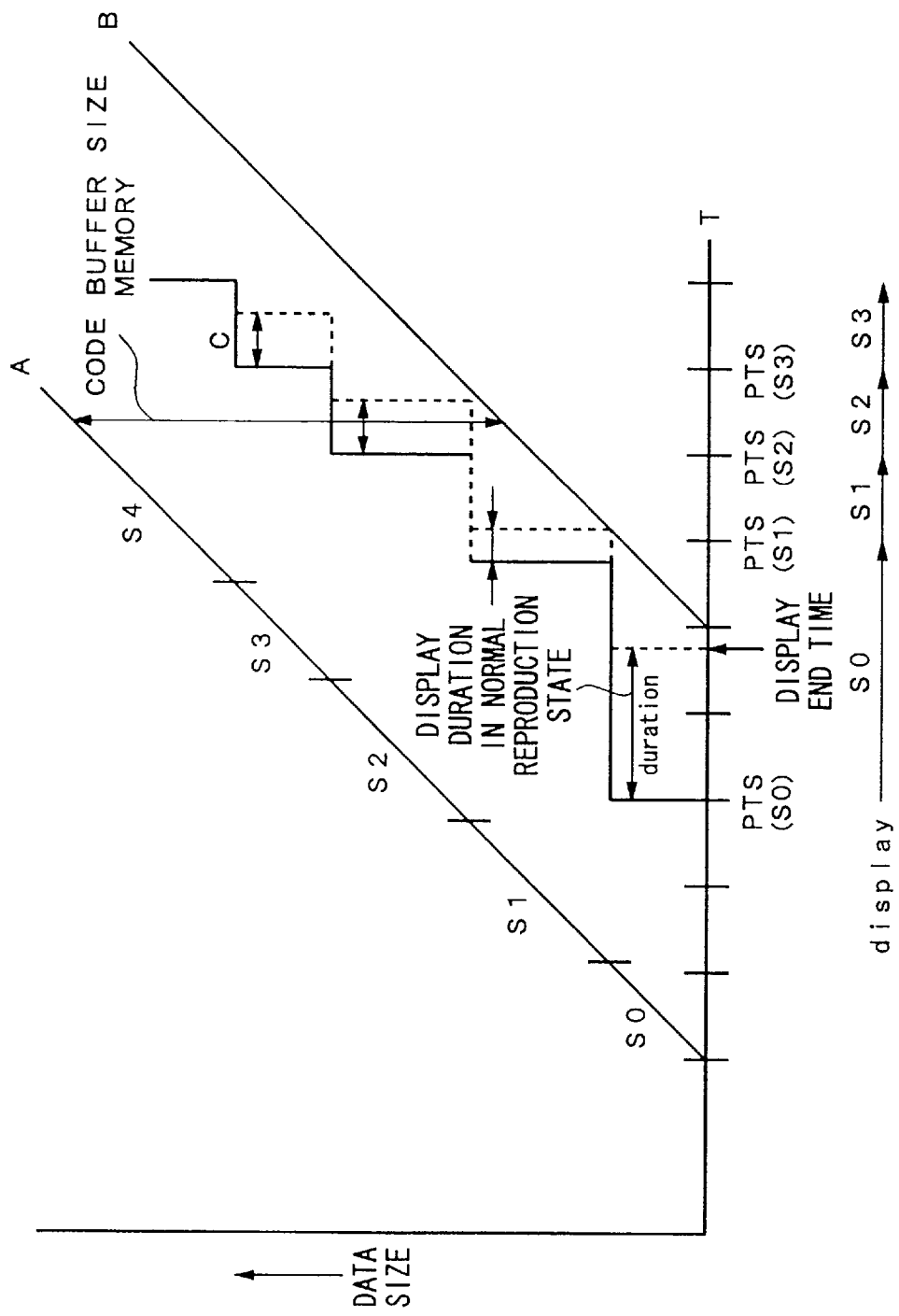
FIG. 8 is a graph for explaining a buffer managing method for storing/displaying a subtitle stream.
Figure 9:
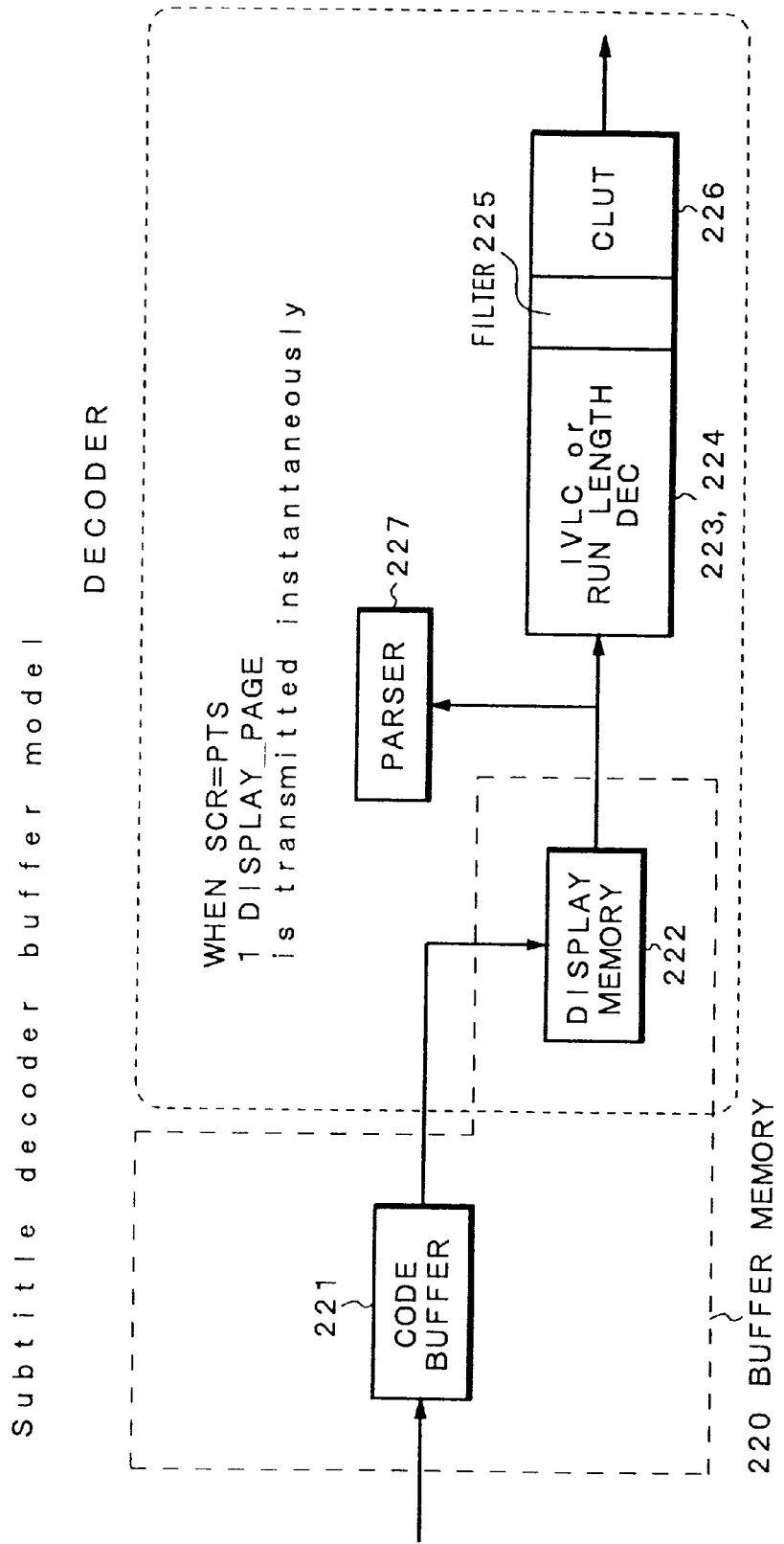
FIG. 9 is a block diagram showing a model of a buffer for explaining the buffer managing method.
Figure 10:
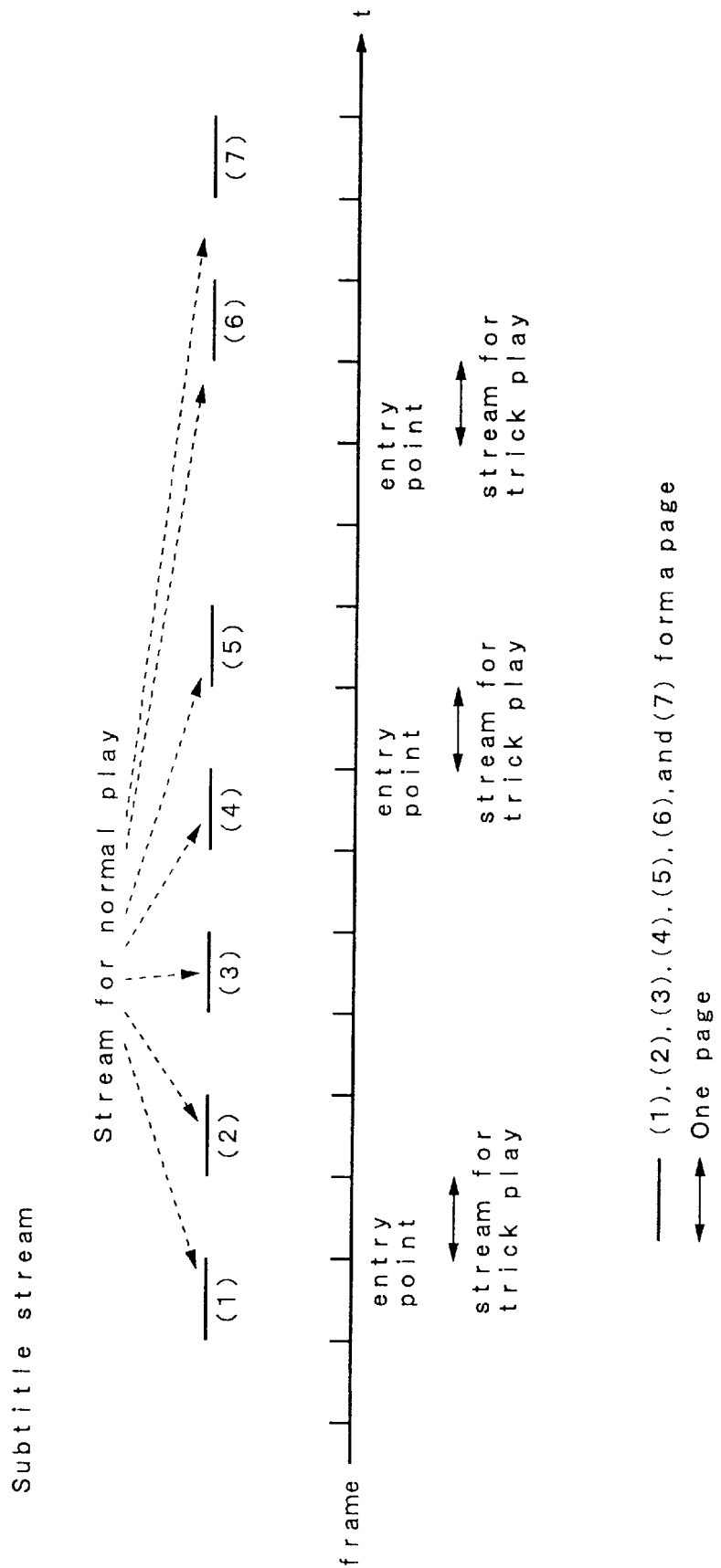
FIG. 10 is a schematic diagram showing stream multiplied states in normal reproduction state and special reproduction state.

FIGS. 8 and 9 are a graph and a schematic diagram for explaining the managing method for the subtitle buffer. In FIG. 8, the vertical axis represents the size of received data. In FIG. 8, the distance between (A) and (B) represents the size of the code buffer. The horizontal axis represents time T. FIG. 9 shows a model of the subtitle decoding buffer for explaining the buffer managing method. A buffer memory 220 is composed of a code buffer 221 and a display memory 222.

The slopes of the inclined lines (A) and (B) represent the bit rate of the bit stream of the subtitle data. The area between the inclined lines (A) and (B) represents the data storage state of the buffer memory. When data is encoded at a fixed rate, the slopes of the lines (A) and (B) are constant. However, when data is encoded at a variable rate, the slopes of the slopes (A) and (B) vary time by time.

When a stair-step line (C) protrudes from the line (B) rightward, the line (C) represents that the buffer memory gets overflowed. When the line (C) protrudes from the line (A), the line (C) represents that the buffer memory gets underflowed. Thus, the subtitle buffer is managed so that it is prevented from getting overflowing and underflowing.

Page data pieces S0, S1, S2, S3, and S4 that are input at a data rate of the slope (B) are sent from the code buffer 221 to the display buffer 222 at display timing PTS(S0), PTS(S1), PTS(S2), and PTS(S3), respectively. Thus, the subtitles are displayed. In FIG. 8, a rising edge of the stair-step line represents the state that data is being sent. In addition, a horizontal line of the stair-step line (C) represents that data is being stored in the code buffer 221. In FIG. 8, "duration" represents the display duration designated corresponding to a parameter intrinsic to each subtitle. The display duration of each subtitle is not constant (end of each frame) unlike with video data.

The buffer management shown in FIG. 8 is based on a decoder buffer model shown in FIG. 9. In FIG. 8, a buffer memory 221 stores a subtitle data stream. After the buffer memory 221 has stored data of at least one page, when the value of the system clock (SCR: System Clock Reference) matches the display time (PTS: Presentation Time Stamp), the data of one page is sent from the storage code buffer 221 to the display buffer memory 222. This portion can be accomplished by updating a pointer in one device. Thus, it is considered that there is no delay in sending data.

With the display buffer 222, data is immediately displayed. For example, with a vertical blanking interval, a parser 227 parses various headers. An inverse variable-length coding circuit 223 or an inverse run-length coding circuit 224 decode data and sends bit map data to a CLUT circuit 226 directly or through a filter 225.

The buffer memory 220, the inverse variable-length coding circuit 223, the inverse run-length coding circuit 224, the CLUT circuit 226, and the filter 225 shown in FIG. 9 are equivalent to the inverse variable-length coding circuit 23, the inverse run-length coding circuit 24, the CLUT circuit 26, and the filter 25 of the video decoder 7 shown in FIG. 5, respectively.

Next, the process of the video decoder 7 in the special reproduction state will be described. FIG. is a schematic diagram showing a subtitle stream for the normal reproduction mode and a subtitle stream for the special reproduction mode. Data pieces (1), (2), (3), (4), (5), (6), and (7) that have been packet-segmented and time-divided represent subtitle data of one page for the normal reproduction mode. In addition, immediately after an entry point, data of one page for the special reproduction is encoded. In the case of a digital video disc player, an address to which the pickup is jumped in the fast forward reproduction mode and rewind reproduction mode is an entry point. In reality, video data is sometimes present immediately after an entry point. In this case, the encoding unit multiplexes the subtitle stream for the special reproduction at sectors that immediately precede and immediately follow the video data represented by the entry point.

In the subtitle decoding apparatus, the word detecting portion 20 sends a stream for the special reproduction or a stream for the normal reproduction to a code buffer of the buffer memory 20 corresponding to the "Stream-Select" information received from the system controller 14.

Likewise, when the "Stream-Select" information represents one of a plurality of subtitle streams corresponding to a plurality of fonts, the word detecting portion 20 selects only a subtitle stream corresponding to a predetermined font. When video data is displayed on monitor with an aspect ratio of 4:3, it is preferred to display both video data and subtitle data with that same aspect ratio. On the other hand, when video data is displayed on a monitor with an aspect ratio of 16:9, video data is input to the monitor in a 4:3 squeeze mode and then expanded to an aspect ratio of 16:9 by the monitor. Likewise, in the case that the aspect ratio of the subtitle data is 4:3 that is the same as the aspect ratio of the video data, when the aspect ratio of the subtitle data is expanded to 16:9 by the monitor, the subtitle data is displayed as with video data. At this point, it is preferred to select a proper one from the plurality of fonts.

According to the present invention, in the data decoder 7, when a stream supplied from the demultiplexer 1 is written to a buffer memory 22, if the word detecting portion 20 detects a header error, the bit map data is not written to the buffer memory 22, but discarded. However, if the word detecting portion 20 detects a data error, it detects a line that has the error and interpolates the data error with data of another line.

In other words, the line processor 40 shown in FIG. 5 detects a line that has an error and stores the addresses of the ends of the lines that immediately precede and immediately follow the line that has the error to the register. Thus, when the line processor 40 reads, decodes, and displays data received from the buffer memory 22, the line processor 40 can display a particular line a plurality of times or skip a particular line by randomly accessing the buffer memory 22. In the case that encoded data is subtitle data, if a line has an error, when lines that immediately precede or immediately follow the line that has the error are accessed, data can be interpolated for each line.

The demultiplexer 58 of the decoding apparatus supplies an error flag along with stream data. Thus, according to the present invention, by checking the error flag, it is determined whether or not the data has an error when data is written to the buffer memory 22. At this point, a unique word added at the end of each line as line end identification code EOL is used.

Figure 11:
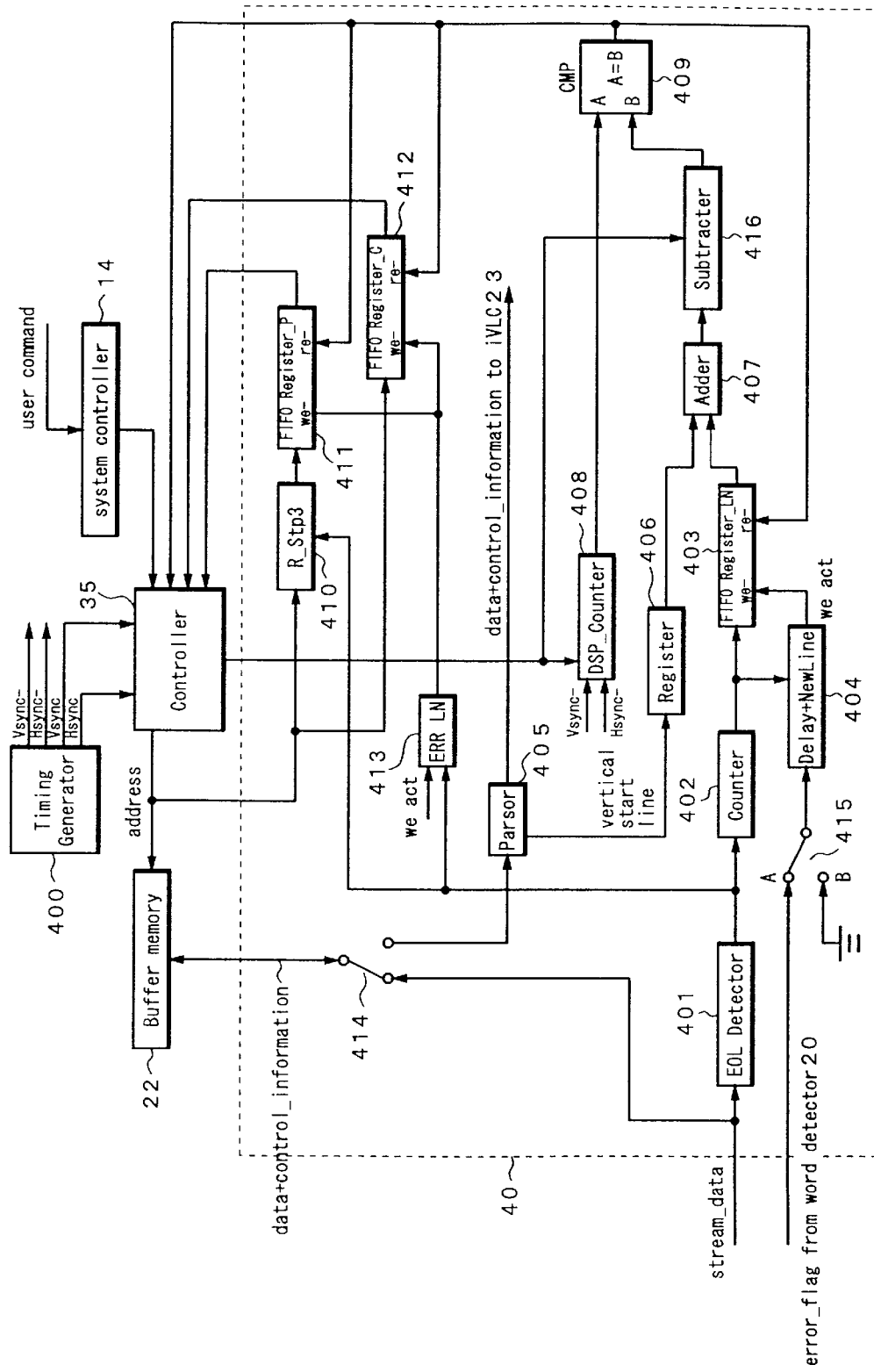
FIG. 11 is a block diagram showing functions of a line processor.

FIG. 11 is a block diagram showing a detailed structure of the line processor 40 shown in FIG. 5. After the word detecting portion 20 has detected timing information, a header error, and a data error, a data stream and an error flag are sent to the line processor 40. A line end detector 401 detects the end of each line with the line end identification code EOL.

Figure 12:
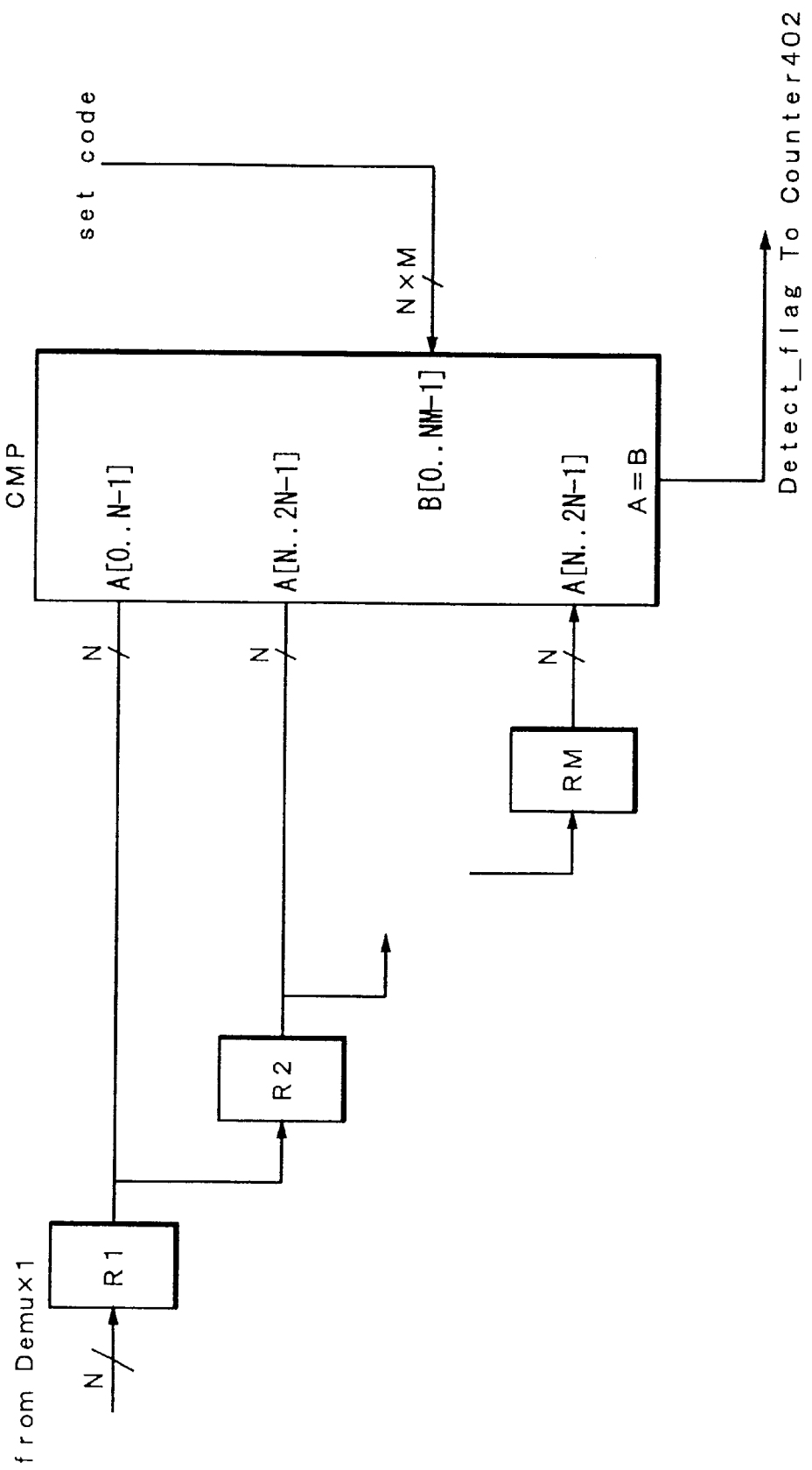
FIG. 12 is a block diagram showing an example of line end identification code detector.

The line end detector 401 has a circuit structure as shown in FIG. 12. In FIG. 12, a comparator successively compares data A of one line received from the demultiplexer with set code B. When the data A matches the set code B, the comparator outputs a detection flag to a counter 402. Whenever data of one line is written, the detection flag is sent to the counter 402. Thus, the counter 402 functions as a line counter. An output signal of the counter 402 is sent to a FIFO register LN 403.

The error flag is supplied from the demultiplexer 1 to a delay and newline circuit 404. In the delay and newline circuit 404, the error flag causes the stream data to be delayed for the time period of which the stream data is delayed by the line end detector 401 and the counter 402. Only when the line number of the error flag does not match the line number stored in the FIFO register LN 403, the error flag causes the signal state of a write enable terminal of the FIFO register LN 403 to be active.

Even if the same line has a plurality of errors, the line number is stored in the FIFO register LN 403 only one time. Thus, the number of lines to be interpolated depends on the number of stages of the FIFO register LN 403.

On the other hand, to store an address of an EOL in the buffer memory 22, the detection flag received from the line end detector 401 is supplied to write enable terminals of a FIFO register P 411 and a FIFO register C 412 that record an address received from the controller 35 through an ERR_LN circuit 413 (that will be described later). Thus, addresses of EOL code stored in the buffer memory 22 are stored in the FIFO registers P 411 and C 412.

The line number of data stored in the FIFO register P 411 is different from the line number of data stored in the FIFO register C 412. For example, as shown in FIG. 14, when an error takes place in a line N and data of a line (N–1) is repeatedly displayed instead of the data of the line N, the address of the EOL of a line (N–2) should be stored. The FIFO register P 411 stores the address of the line (N–2).

When an error is detected in data of the line N that is being written to the buffer memory 22, the address of the EOL of the line (N–2) is sent to the FIFO register P 411 through a three-staged register 410.

The register 410 circulates stream data in three stages of the register so as to supply an EOL address of two lines before to the FIFO register 411. In reality, the register 410 is enabled with an output signal of the line end detector 401 so that the address of the EOL of each line is always stored. On the other hand, since the FIFO register C 412 stores the address of the EOL of a line that has an error, the address is written at timing of which the EOL of the current line is detected.

The ERR_LN circuit 413 causes the signal levels of the write enable terminals of the FIFO register P 411 and the FIFO register C 412 to become active with the write enable signal WE received from the delay and newline circuit 404 and the detection flag received from the line end detector 401.

In the example shown in FIG. 14, when data of a line (N–2) to data of a line (N+4) are stored in the buffer memory 22, an address ADR (EOL_N–2) and an address ADR (EOL_N+1) are stored in the FIFO register P 411. In addition, an address ADR (EOL_N) and an address ADR (EOL_N+3) are stored in the FIFO register C 412.

When data is read from the buffer memory 22, the data is sent to the parser 405 and the display start line is set to a register 406. Output data of the register 406 and the line number that has an error stored in the FIFO register 403 are added by an adder 407. The adder 407 outputs a line number to which an offset has been added. The resultant line number should be obtained more early than the real display line. Thus, the timing generator 400 generates a V sync, a H sync, a V sync-, and a H sync-. The V sync- and H sync- are generated more early than the V sync and H sync, respectively.

With the earlier synchronous pulses V sync- and H sync-, in a comparator 409, when the error line number received from the adder 407 matches the error line number received from a DSP_Counter 408, the signal levels of the read enable-terminals of the FIFO register P 411, the FIFO register C 412, and the FIFO register LN 403 become active. Thus, the end address ADR (EOL_N–2) of two lines before and the line end address ADR (EOL_N) of the current line are read from the FIFO register P 411 and the FIFO register C, respectively.

Figure 13:
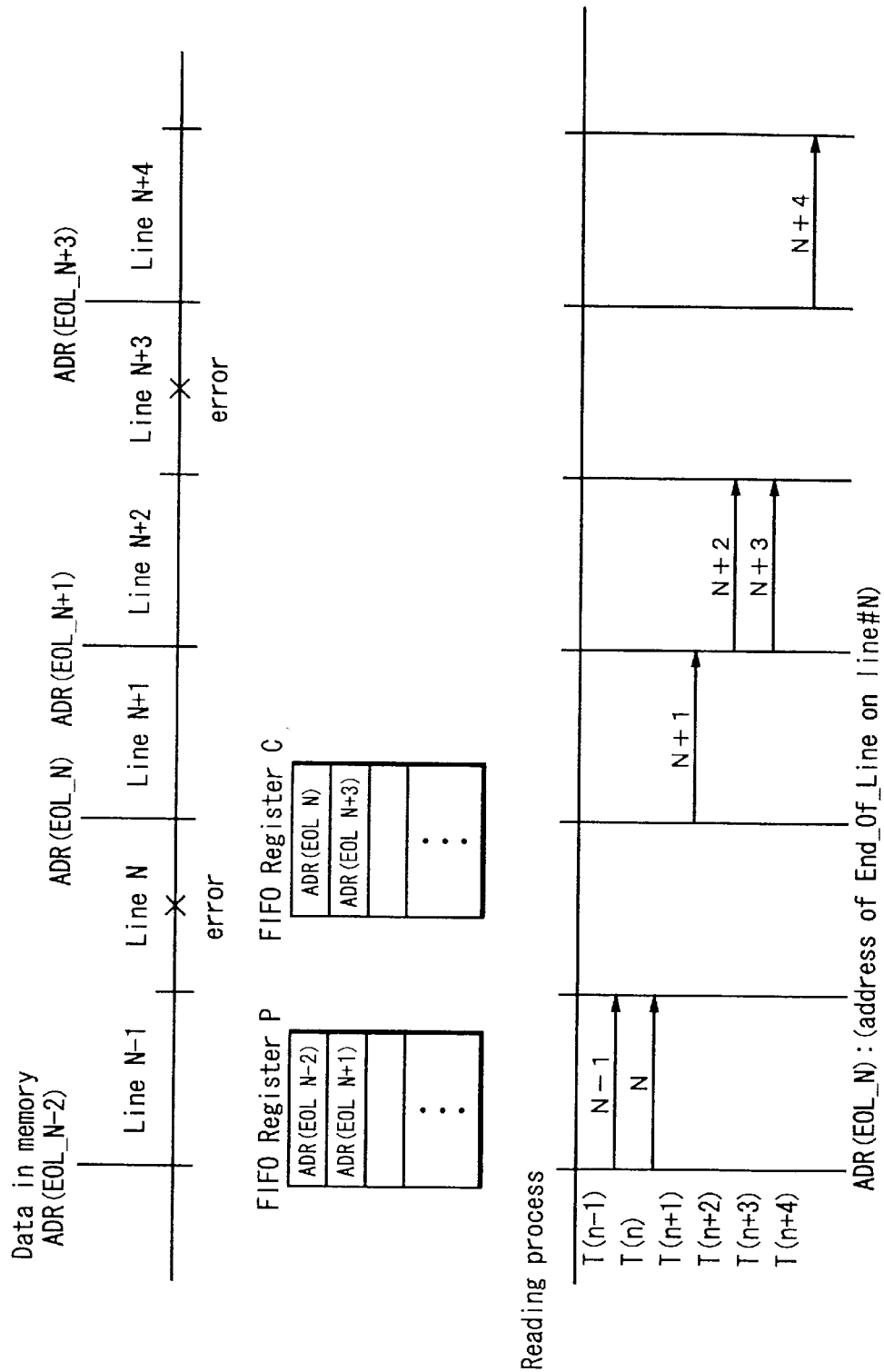
FIG. 13 is a schematic diagram showing data that is stored in an FIFO register and that is read therefrom.

The controller 35 references the two addresses that have been read. In addition, the controller 35 references the address ADR (EOL_N–2) received from the FIFO register P 411 instead of reading data of the current line that has an error and accesses the buffer memory at timing of an H sync of the display system. After the controller 35 has read the immediately preceding line, the controller 35 references the address ADR (EOL_N) received from the FIFO register C 412 and accesses the buffer memory at timing of an H sync of the display system. FIG. 13 is a timing chart showing such a reading process. Thus, as shown in FIG. 14, in contrast with a picture (1) of a subtitle that does not have an error, a line that has an error is interpolated with another line that does not have an error as a picture (2).

Assuming that each of the FIFO register LN 403, the FIFO register P 411, and the FIFO register C 412 has N-state, according to the present invention, errors in N lines including those in a frame/field that are not displayed and stored in the buffer memory can be interpolated. When errors take place in more than N lines, these errors cannot be interpolated. In such a case, countermeasures for prohibiting such a frame/field from being displayed are required. In other words, depending on the strategy of how many lines of one or a plurality of frames/fields are interpolated, the number of stages of each FIFO register is determined.

In the case that the number of stages of each FIFO circuit is sufficient, when a switch 415 is positioned to a terminal B, regardless of whether or not data has an error, the line numbers of all lines and addresses of the line end identification code thereof are stored in the FIFO register LN 403, the FIFO register P 411, and the FIFO register C 412. Thus, any display line can be accessed. When the user issues a vertical scrolling command to the controller 35 through the system controller 14, the controller 35 starts counting H sync pulses before causing the DSP counter 408 to count, removes information to be skipped from the FIFO register LN 403, the FIFO register P 411, and the FIFO register C 412, and supplies skip values to a subtracting port of a subtracter 416. Thus, display data stored in the buffer memory 22 is skipped for a predetermined number of lines. When the controller 35 varies display data for each frame, data can be vertically scrolled.

Figure 15A:
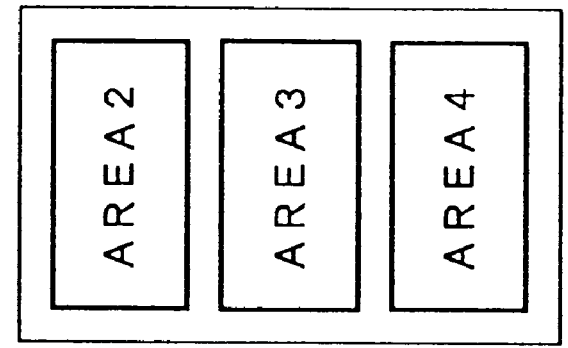
FIGS. 15A, 15B, and 15C are schematic diagrams showing a processed result of the line processor.
Figure 15B:
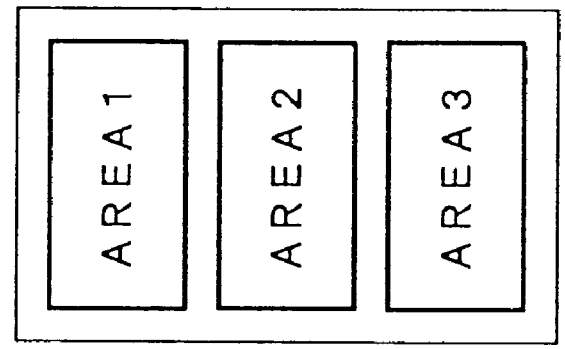
Figure 15C:
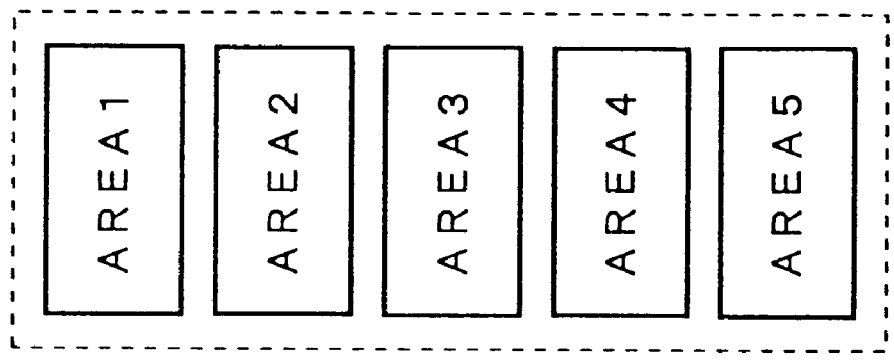

Next, such a process will be described with reference to FIG. 15. When data shown in FIG. 15A is stored in the buffer memory 22, data can be displayed as shown in FIG. 15B. Alternatively, data can be displayed from a particular line thereof as shown in FIG. 15C.

Figure 16:
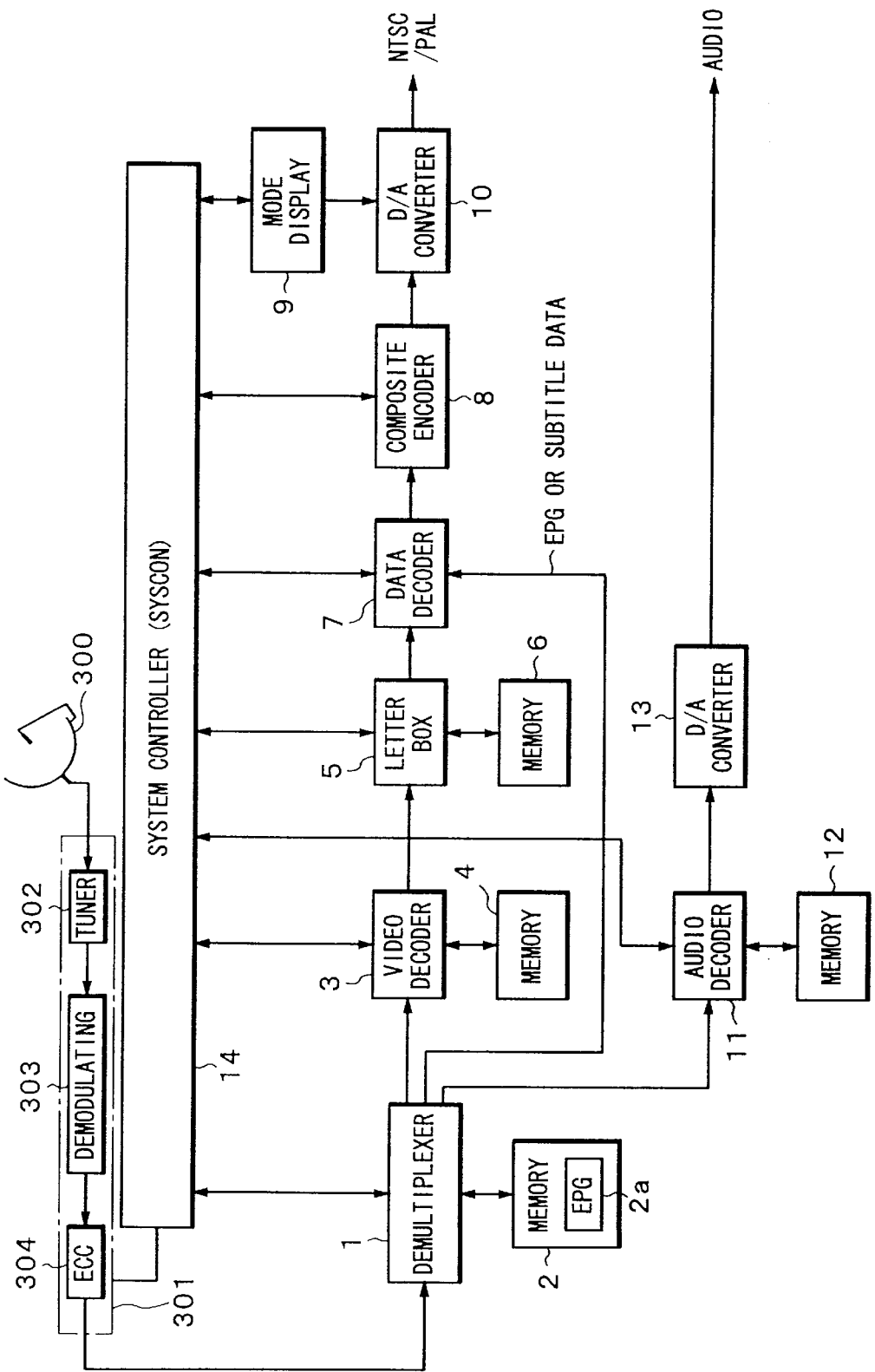
FIG. 16 is a block diagram showing an overall structure of a digital television broadcast receiver according to the present invention.
Figure 17A:
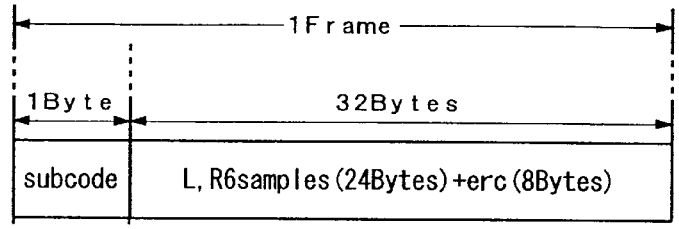
FIGS. 17A, 17B, and 17C are schematic diagrams showing subcode of a conventional CD that handles graphics data.
Figure 17B:
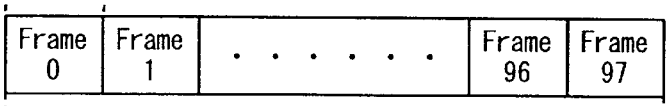
Figure 17C:
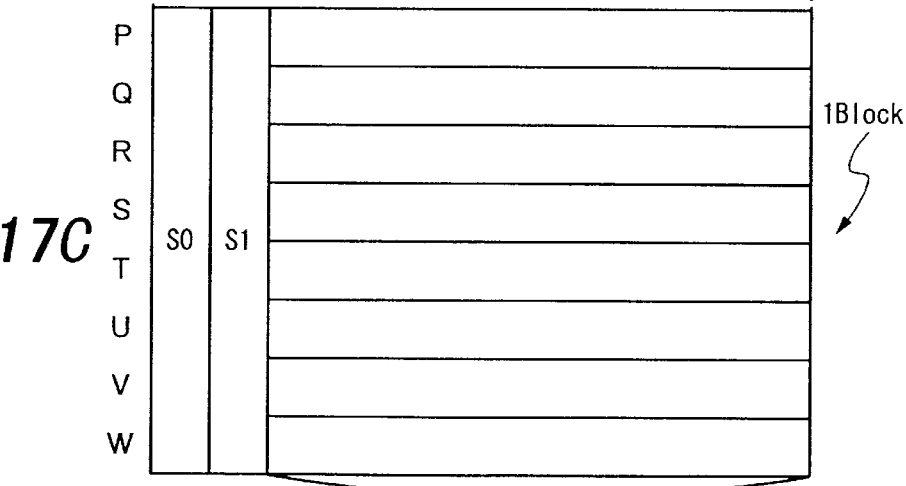
Figure 18:
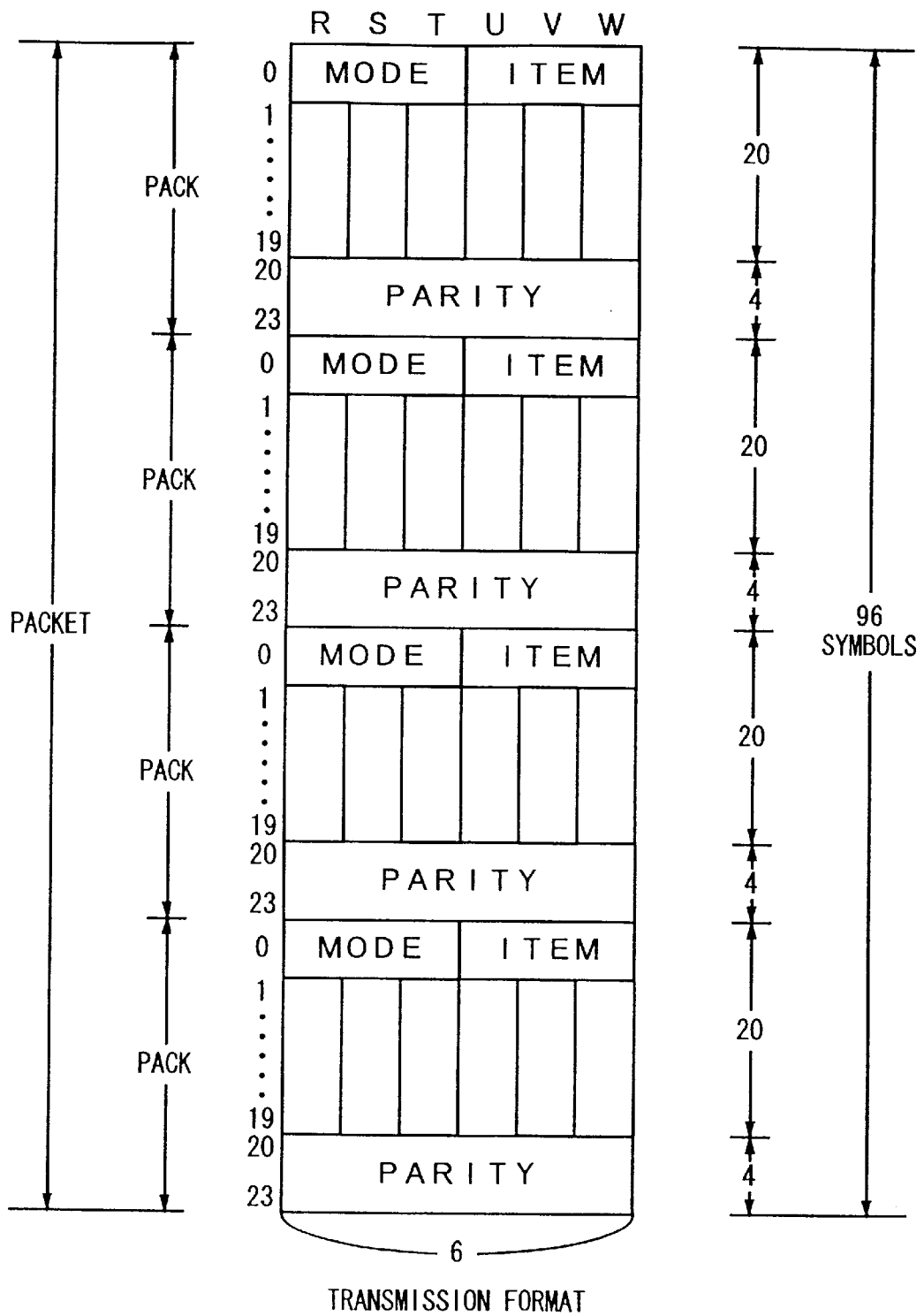
FIG. 18 is a schematic diagram showing data structure of a conventional CD that stores graphics data.

The above-described example is applied to a digital video disc player. However, the present invention can be applied to another decoding apparatus. FIG. 16 shows the structure of a digital television broadcast receiver according to the present invention.

An RF signal received from a receiving antenna 300 is supplied to a tuner 302 of a front end 301. The tuner 302 is connected to a QPSK demodulator 303 and an error correcting circuit 304. The error correcting circuit 304 outputs a transport stream corresponding to the MPEG2 standard. A demultiplexer 1 separates the stream into video packets, audio packets, and data packets.

A memory 2 connected to the demultiplexer 1 has an area 2a that stores an EPG (Electrical Program Guide) that is font data. In addition, subtitle data is placed in data packets. Video data received from the demultiplexer 1 is supplied to a video decoder 3. The video decoder 3 decodes MPEG video data and outputs video data. Audio data received from the demultiplexer 1 is supplied to an audio decoder 11. The audio decoder 11 decodes MPEG audio data and outputs audio data.

Bit map data (EPG data or subtitle data) received from the demultiplexer 1 is supplied to a data decoder 7. The subtitle data is processed by the data decoder 7 that is equivalent to that of the above-described embodiment shown in FIG. 1. In the case of the EPG data, since it does not have a time stamp (PTS), with a user's command or the like, the EPG data is directly sent to a display buffer (not through a code buffer) and immediately displayed. Alternatively, the EPG data may be sent not through the inverse variable-length coding circuit 23, the inverse run-length coding circuit 24, and the filter 25 (thus, they are bypassed).

In FIG. 16, for simplicity, a security module (including an IC card reader) that accomplishes conditional accessing (CA), an interface that receives a user's command, and a telephone line connecting portion that sends customer information are omitted.

In the case of a digital television broadcast receiver, when subtitle data and EPG data are written to the buffer memory, the data decoder 7 identifies lines that have errors, determines all the errors before data is displayed, and then accesses the buffer memory. Thus, even if a line has an error, the line can be interpolated with adjacent lines.

In addition, the present invention can be applied to the case that graphics data is displayed with a CD-G.

As described above, according to the present invention, even if lines corresponding to the number of stages of each FIFO buffer have errors, before data is displayed, since the lines that have errors can be determined, a line that immediately precedes or immediately follows the line that has an error can be displayed. Alternatively, lines that have errors can be kept blank, not displayed. Thus, when a frame/field does not have many errors, according to the present invention, lines that have errors can be interpolated and displayed. Consequently, data that have an error can be displayed as much as possible. Thus, the present invention can provide the user with convenience from an entertainment point of view.

In addition, since a line can be randomly accessed, when a particular line is repeatedly displayed, an extra memory is not required. Thus, the cost of the decoding apparatus does not increase as an advantage thereof.

Moreover, according to the present invention, corresponding to a user's interactive command, an area for graphics data and so forth can be limited/selected. Furthermore, data can be scrolled. Thus, according to the present invention, various applications can be structured.

What is claimed is:

1. A data decoding apparatus for receiving bit stream data including at least a digital video signal and graphic data, comprising:

extracting means for extracting said graphic data from the received bit stream data;

error detecting means for detecting an error in the extracted graphic data; and substituting means for substituting the graphic data that has the error with graphic data that does not have an error.

2. The data decoding apparatus as set forth in claim 1, wherein said graphic data is comprised of a plurality of lines of bit map data, wherein said error detecting means detects a line that has an error, and wherein said substituting means substitutes the line that has an error with a line that does not have an error.

3. A data decoding apparatus for receiving bit stream data including at least a digital video signal and graphic data, comprising:

extracting means for extracting said graphic data from the received bit stream data, said graphic data being comprised of a plurality of lines of bit map data;

error detecting means for detecting a line of the extracted graphic data that has an error; and substituting means for substituting the line that has an error with a line that does not have an error; said substituting means having a buffer memory for storing the extracted graphic data and instead of reading a line that has an error, the buffer memory is randomly accessed so as to read the stored lines that immediately precede or immediately follow the line that has an error.

4. The data decoding apparatus as set forth in claim 3, wherein said graphic data includes character data.

5. The data decoding apparatus as set forth in claim 4, wherein said error detecting means has:

counter means that counts up whenever line end identification code contained in the character data is detected; and a register for storing the count value of said counter means as a line number when the error is detected, wherein said substituting means has:

line number generating means for generating a line number that precedes the line number of a line that is read from said buffer memory so as to actually display character data;

line number comparing means for comparing the generated line number with the line number of a line that has an error and that is stored in said register; and data reading means for reading data of a line that immediately precedes or immediately follows the generated line number from said buffer memory when the line numbers match as the compared result of said line number comparing means.

6. The data decoding apparatus as set forth in claim 5, further comprising:

reproducing means for reproducing information stored in a record medium and outputting the bit stream data.

7. The data decoding apparatus as set forth in claim 6, wherein the character data is data of a subtitle.

8. The data decoding apparatus as set forth in claim 5, further comprising:

receiving means for receiving a digital television broadcast signal, demodulating the received signal, and outputting the bit stream data.

9. The data decoding apparatus as set forth in claim 8, wherein the character data is data of a subtitle.

10. The data decoding apparatus as set forth in claim 8, wherein the character data is data of a program guide.

11. A data decoding method for receiving bit stream data including at least a digital video signal and graphic data, comprising the steps of:

extracting said graphic data from the received bit stream data;

detecting an error in the extracted graphic data; and substituting the graphic data that has the error with graphic data that does not have an error.

12. The data decoding method as set forth in claim 11, wherein said graphic data is comprised of a plurality of lines of bit map data, wherein said error detecting step is performed by detecting a line that has an error, and wherein the substituting step is performed by substituting the line that has an error with a line that does not have an error.

13. A data decoding method for receiving bit stream data including at least a digital video signal and graphic data, comprising the steps of:

extracting said graphic data from the received bit stream data, said graphic data being comprised of a plurality of lines of bit map data;

detecting a line of the extracted graphic data that has an error; and substituting the line that has an error with a line that does not have an error by storing the extracted graphic data in a buffer memory and instead of reading a line that has an error, the buffer memory is randomly accessed so as to read the stored lines that immediately precede or immediately follow the line that has an error.

14. The data decoding apparatus as set forth in claim 13, wherein said graphic data includes character data.

15. The data decoding method as set forth in claim 14, wherein the error detecting step has the steps of:

counting up a counter whenever line end identification code contained in the character data is detected; and storing the count value of the counter step as a line number when the error is detected, wherein the substituting step has the steps of:

generating a line number that precedes the line number of a line that is read from the buffer memory so as to actually display character data;

comparing the generated line number with the line number of a line that has an error and that is stored in the register; and reading data of a line that immediately precedes or immediately follows the generated line number from the buffer memory when the line numbers match as the compared result of the line number comparing step.

16. The data decoding method as set forth in claim 15, further comprising the steps of:

reproducing information stored in a record medium and outputting the bit stream data.

17. The data decoding method as set forth in claim 16, wherein the character data is data of a subtitle.

18. The data decoding method as set forth in claim 15, further comprising the steps of:

receiving a digital television broadcast signal, demodulating the received signal, and outputting the bit stream data.

19. The data decoding method as set forth in claim 18, wherein the character data is data of a subtitle.

20. The data decoding method as set forth in claim 18, wherein the character data is data of a program guide.

* * * * *